US007280796B2

(12) United States Patent
Isokawa et al.

(10) Patent No.: US 7,280,796 B2
(45) Date of Patent: Oct. 9, 2007

(54) IMAGE FORMING APPARATUS

(75) Inventors: Hiroshi Isokawa, Hino (JP); Ritsuo Fujii, Hachioji (JP); Seiji Yamaguchi, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 140 days.

(21) Appl. No.: 11/179,914

(22) Filed: Jul. 12, 2005

(65) Prior Publication Data

US 2006/0088352 A1 Apr. 27, 2006

(30) Foreign Application Priority Data

Oct. 25, 2004 (JP) ............................. 2004-309317

(51) Int. Cl.
*G03B 21/10* (2006.01)
*G03B 21/12* (2006.01)

(52) U.S. Cl. ....................... 399/358; 399/359; 399/360

(58) Field of Classification Search ................ 399/358, 399/359, 360
See application file for complete search history.

(56) References Cited

U.S. PATENT DOCUMENTS 5,272,510 A * 12/1993 Reese et al. ................ 399/358
5,815,784 A * 9/1998 Kasahara et al. ........... 399/358
5,987,298 A 11/1999 Muramatsu et al.

FOREIGN PATENT DOCUMENTS

| | | |
|---|---|---|
| JP | 11 237823 A | 8/1998 |
| JP | 10-307520 | 11/1998 |
| JP | 11 288171 A | 10/1999 |
| JP | 11 338327 A | 12/1999 |
| JP | 10 307520 A | 7/2006 |

* cited by examiner

*Primary Examiner*—Sandra L. Brase
(74) *Attorney, Agent, or Firm*—Lucas & Mercanti, LLP

(57) ABSTRACT

An image forming apparatus including: a cleaning member for cleaning an image carrier after a toner image on the image carrier has been transferred; a toner recycling device for conveying toner removed by the cleaning member to a developing device; a collection section where the toner removed by the cleaning member is collected; a branch conveyance path, branched from the toner recycling device, for conveying the toner to the collection section; and an air pump, provided on the branch conveyance path, for sucking air with the toner; wherein, whether the toner is conveyed from the cleaning member to the collection section or to the developing device is switched corresponding to whether the air pump operates or does not operate.

12 Claims, 3 Drawing Sheets

IMAGE FORMING APPARATUS

This application is based on Japanese Patent Application No. 2004-309317 filed on Oct. 25, 2004 in Japanese Patent Office.

BACKGROUND OF THE INVENTION

The present invention relates to an image forming apparatus, particularly to an image forming apparatus equipped with toner recycling device.

An image forming apparatus equipped with toner recycling device has been very popular but, because recycled toner deteriorates image quality, preventive measures against it have been taken.

The Patent Document 1 proposes an image forming apparatus in which a toner recycle mode for conveying the toner collected by a cleaning member to a developing device and a toner disposal mode for accumulating the waste toner collected by a cleaning member into a collection container are automatically selectable.

In an image forming apparatus like the above, the toner disposal mode for discharging toner into a collection container is selected when image quality is given the first priority and the toner recycle mode is selected when toner consumption needs to be saved to minimize the running cost.

Patent Document 1 Japanese non-examined Publication Application No. 10-307520

The image forming apparatus of the Patent Document 1 is equipped with an automatic recycling/disposal switching system on a conveyance path for conveying toner from the cleaning member to the developing device and, by switching the automatic recycling/disposal switching system, the toner recycle mode and toner disposal mode are automatically switched.

Switching by an automatic switching system like the above involves a problem that the system may not operate correctly because of its complicated mechanism including couplings and gears.

The selection as to whether the toner recycle mode is used or the toner disposal mode used is not frequently changed but most image forming apparatuses are used in one mode for a long time and then switched to another mode. This is because, once the apparatus is installed in an office, it is very rare that users change their way of usage and accordingly the usage mode of the apparatus seldom changes. It is only in case the machine is moved to another location or reused by different users that the usage mode (or application mode) changes. When the usage mode significantly changes, the toner recycle mode and toner disposal mode are switched.

On an apparatus having been put in service for a long time, small gaps in a toner conveyance path or the like have been clogged with toner and accordingly switching the toner conveyance path is difficult in many cases. In an apparatus like the one in the Patent Document 1 in which the toner recycle mode and toner disposal mode are switched by an automatic switching system comprising complicated mechanism provided on a toner conveyance path, it is likely to happen that the automatic switch system for disposal does not operate correctly.

In addition, since the automatic recycling/disposal switching system of the Patent Document 1 comprises complicated mechanism and contains a number of components, it involves a high cost problem.

SUMMARY OF THE INVENTION

The present image forming apparatus comprises: a cleaning member for cleaning an image carrier after a toner image on the image carrier has been transferred; a toner recycling device for conveying toner removed by the cleaning member to a developing device; a collection section where the toner removed by the cleaning member is collected; a branch conveyance path, branched from the toner recycling device, for conveying the toner to the collection section; and an air pump, provided on the branch conveyance path, for sucking air with the toner; wherein, whether the toner is conveyed from the cleaning member to the collection section or to the developing device is switched corresponding to whether the air pump operates or does not operate.

DETAILED DESCRIPTION OF THE PREFERRED EMBODIMENT

Figure 1:
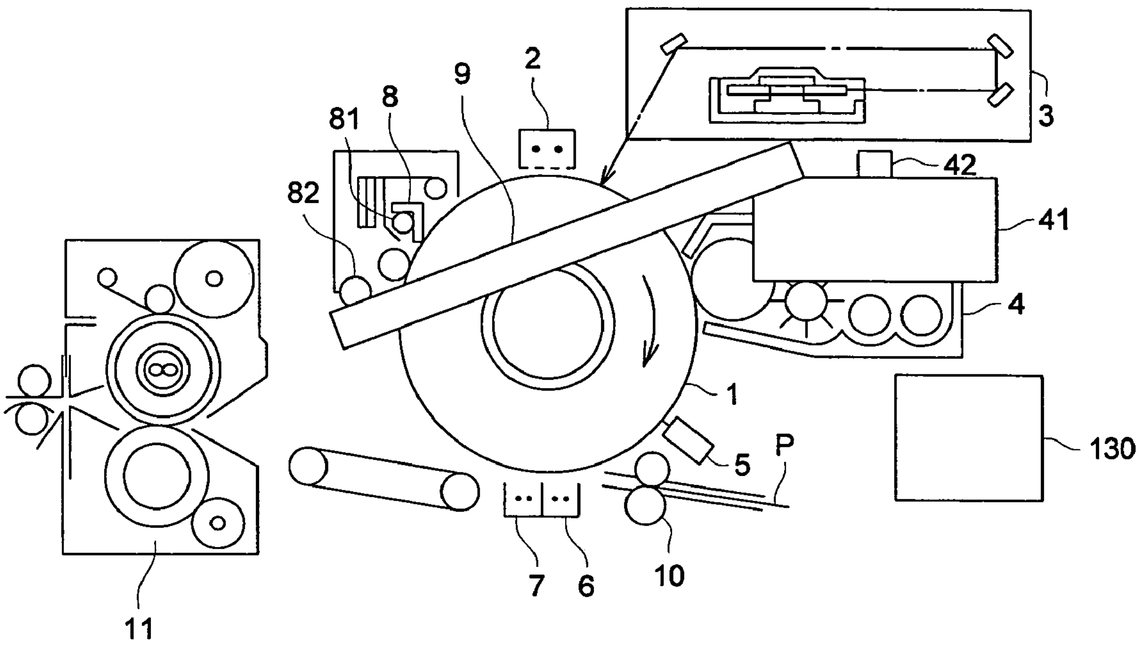
FIG. 1 is a schematic drawing showing the image forming section of an image forming apparatus according to an embodiment of the present invention.

Embodiments will now be described, by way of example only, with reference to the accompanying drawings which are meant to be exemplary, not limiting, and wherein like elements numbered alike in several Figures, in which:

An image forming apparatus according to an embodiment of the present invention is described hereunder, using figures. FIG. 1 is a figure showing the image forming section of an image forming apparatus according to an embodiment of the present invention.

Reference 1 shows an image carrier, a drum-shaped photosensitive material, for which negative charging OPC photosensitive material is preferably employed. Reference 2 shows an electro-static charging member for charging the surface of the rotating photosensitive material 1 with a specified polarity and potential evenly, for which scorotron charger is preferably employed. Reference 3 shows an exposing device, for which a scanning exposure type exposure system using semiconductor laser as light source is preferably employed, and it exposes dot-wisely the photosensitive material 1. Reference 4 shows a developing device that develops the electro-static latent image formed on the photosensitive material 1 into a toner image, using two-component developer having toner and carrier. The developing device 4 develops the latent image with reversal development, using toner charged with the same polarity as the photosensitive material 1. To the developing device 4, not only toner is supplied from a toner supply section 42 but also recycled toner is supplied from a toner recycling device 9. Reference 5 shows a pre-exposure light source to irradiate on the toner image for enhancing its transferability. Reference 6 is a transfer member comprising of a corotron charger and 7 shows a separation member comprising a corotron.

Transfer paper P fed from a paper feeder is supplied to a transfer section by a registration roller 10 in synchronism with the toner image formed on the photosensitive material 1. In the transfer section, the toner image is transferred from the photosensitive material 1 onto the transfer paper P by the transfer member 6, and the transfer paper P is separated from the photosensitive material 1 by the separation member 7 after transfer. The separated transfer paper P is then subjected to a fixing process through a fixing device 11 and then ejected outside the apparatus.

The photosensitive material 1 after transfer is cleaned by the cleaning member 8. The cleaning member 8 is equipped with a cleaning blade 81 made of urethane rubber and the photosensitive material 1 is cleaned as remaining toner after transfer is wiped off from the surface of the photosensitive material 1 by the cleaning blade 81. The toner removed from the photosensitive material 1 is discharged out of the cleaning member 8 by a screw 82.

Figure 2:
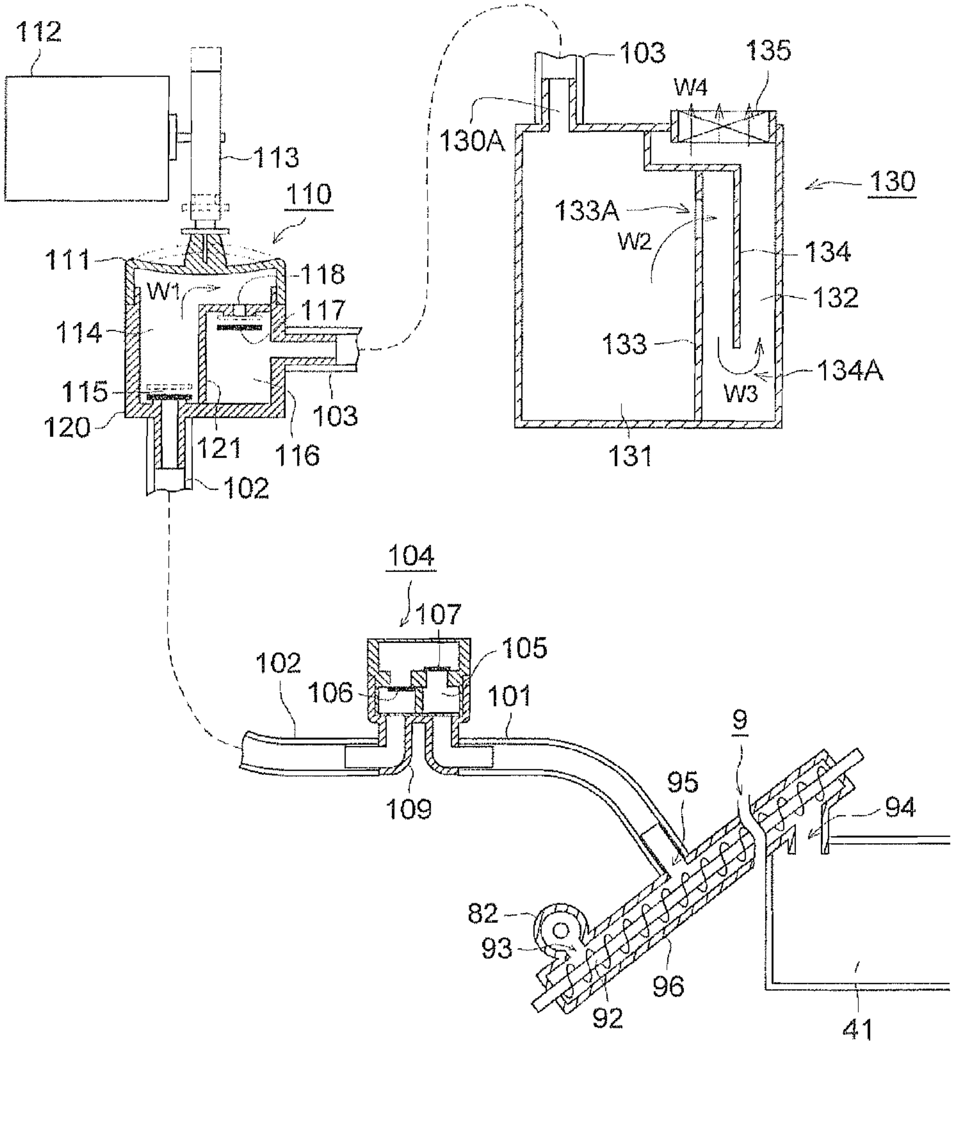
FIG. 2 is a schematic drawing showing the conveyance path of collected toner.

Reference 9 is the toner recycling device, comprising a conveying pipe 91 and screw 92 (see FIG. 2). The toner collected by the cleaning member 8 is conveyed by the screw 82 towards near side in FIG. 1 at the bottom of the cleaning member 8. The recycling device 9 is installed on this side of the photosensitive material 1 and developing device 4 in FIG. 1, and the toner conveyed by the recycling device 9 is put into an intermediate hopper 41 that temporarily stores toner to be supplied to the developing device 4. The recycled toner supplied from the toner recycling device 9 and new toner supplied from the toner supply 42 are mixed, and then supplied to the developing device 4.

FIG. 2 is a figure showing the conveyance path of the collected toner collected by the cleaning member 8.

FIG. 2, the toner recycling device 9 comprises a conveying pipe 91 and screw 92 for conveying toner, and an inlet 93 and outlets 94 and 95 are provided on the conveying pipe 91. The toner conveyed by the screw 82 of the cleaning member 8 flows in through the inlet 93. The outlet 94 is connected with the intermediate hopper 41 and the toner discharged from the outlet 94 is supplied to the developing device 4 via the intermediate hopper 41. The outlet 95 is connected with the reverse flow prevention device 104 by a conveying pipe 101.

The toner recycling device 9 is connected with the reverse flow prevention device 104 by the conveying pipe 101, the reverse flow prevention device 104 is connected with the air pump 110 by a conveying pipe 102, and the air pump 110 is connected with a collecting section, collection container 130 by a conveyance tube 103. As explained above, the air pump 110 is provided on the branch conveyance path having each conveying pipe branched from the recycling device 9.

The reverse flow prevention device 104, which prevents the toner from flowing reversely from the air pump 110 to the recycling device 9, prevents the reverse flow by means of the first and second valves 107 and 106 that are provided in an incoming chamber and in the outgoing chamber of the encapsulated receptacle 105, and open and close the first and second vent port, respectively. The first valve 107 installed in the incoming chamber can move upwards in FIG. 2 and the second valve 106 installed in the outgoing chamber can move downwards in FIG. 2.

The air pump 110 is a diaphragm pump and the pump housing 120 comprises a suction chamber 114 and exhaust chamber 116 separated by a partition 121. The suction port of the air pump 110 is connected with the conveying pipe 102 and the exhaust port is connected with the conveying pipe 103. The suction chamber 114 and exhaust chamber 116 are connected with each other through a vent port 118.

Part of the outside of the air pump 110 is formed as diaphragm 111 made of elastic rubber and the diaphragm 111 deforms from a state shown by a bold line to a state shown by a dotted line when driven by an eccentric rotating member 113 driven by a motor 112.

The eccentric rotating member 113 is rotated by the motor 112 and the diaphragm 111 is deformed from the state shown by a bold line to the state shown by a dotted line by this rotation so as to change the volume of the suction chamber 114 and accordingly increase or decrease the pressure in the suction chamber 114. By this increase or decrease of the pressure, each third valve 115 and fourth valve 117 moves from/to the lower position shown by the bold line to/from the upper position shown by the dotted line alternately so as to convey the fluid in one direction shown by the arrow W1.

The collection container 130, as collection section, for accumulating the discharged toner has a main accumulation chamber 131 and sub accumulation chamber 132 and they are separated by a partition 133. The sub accumulation chamber 132 is further separated by a partition 134. The vent port 133A provided on the partition 133 and vent port 134A provided on the partition 134 are at different height as shown in the figure. Reference 135 shows a dust filter installed on the exhaust port.

Toner-laden air incoming into the collection container 130 through an inlet port 130A connected with the conveying pipe 103 flows through the vent port 133A and into the sub accumulation chamber 132 as shown by the arrow W2. Then, it flows downward and then upward through the vent port 134A as shown by the arrow W3. Finally, it is exhausted from the exhaust port equipped with the dust filter 135 to the outside of the container as shown by the arrow W4. Since the amount of toner accumulated in the sub accumulation chamber 132 is very small, the volume of the sub accumulation chamber 132 can be small.

Because the air is exhausted to the outside of the container after it passes through a crooked labyrinthine guide path, toner contained in the air falls down and hence separated from the air while the air passes through the collection container 130. Accordingly, the air passing through the dust filter 135 contains little toner and any toner contained in the exhaust is removed by the dust filter 135, and so the environment where the apparatus is installed is effectively prevented from possible contamination due to the toner contained in the air exhausted from the collection container 130.

In the toner recycle mode where the toner collected by the cleaning member 8 is conveyed to the developing device 4 and used again, the air pump 110 is set OFF and will not operate even in the image forming process.

Since the air pump 110 does not operate in the image forming process, the toner collected by the cleaning member 8 is conveyed to the recycling device 9 and supplied to the developing device 4 for reuse via the intermediate hopper 41.

Constructing the conveying tubes 101, 102 and 103 with flexible pipe material such as rubber hose enables to freely select the location of the collection container 130. The collection container 130 can be installed inside the image forming apparatus shown in FIG. 1 or can be either installed outside. Accordingly, it becomes possible to provide the volume of the collection container 130 as much as needed and also installation and removal of the collection container 130 becomes easy.

In the toner disposal mode where the toner collected by the cleaning member 8 is accumulated in the collection container 130, the air pump 110 operates in synchronism with the image forming process, that is, the rotation of the photosensitive material 1 in the image forming section. As the air pump 110 operates, the toner conveyed in the toner recycling device 9 is sucked and conveyed through the conveying pipes 101 and 102, air pump 110 and conveying pipe 103, all constituting the branch conveyance path, to the collection container 130 and accumulated there.

Even if toner flows reversely from the toner conveyance system including the air pump 110 to the recycling device for some reason, the toner is shut out by the reverse flow prevention device 104 and so toner scattering is prevented.

When the collection container 130 becomes full of toner, the collection container 130 is removed from the image forming apparatus and disposed. Since the volume of the collection container 130 can be made sufficient enough as compared to the discharged toner volume, it is possible that the collection container 130 is kept in place for the entire service life of the image forming apparatus.

The toner recycle mode and toner disposal mode can be switched by the operation on the operation panel of the image forming apparatus, for example by an input on an operation screen. Accordingly, switching the two modes is done by a service person or a user. In case of an image forming apparatus connected with an external terminal such as personal computer, switching can be set also from the external terminal. In addition to an apparatus, which is set directly to either of the modes, it is possible to so control the apparatus that either of the modes is automatically selected according to the setting of other conditions.

Furthermore, it is also possible that the darkening area ratio (ratio of the area, where toner is to be applied, to the whole image area) is judged according to the image data of original image and either of the modes is selected depending upon the ratio. Darkening area ratio can be judged by a well-known technique. The darkening area ratio of an ordinary character image is about 6% but, if the darkening ratio decreases down to about 2% or less, the image quality deteriorates in the toner recycle mode because, although the toner consumption becomes less, the amount of toner collected by the cleaning member does not change remarkably and so the percentage of the collected toner in the developing device becomes relatively high. It, therefore, is possible to set the first set value as the lower limit value of 2% for example, and so control that the air pump 110 is automatically operated to accumulate the collected toner into the collection container 130 when the darkening area ratio judged from the image data is less than 2%. The reason why the amount of toner collected does not change remarkably is that the toner excessively placed over the background image area of the photosensitive material and the toner applied on the photosensitive material for protecting the cleaning blade from abrasion are also collected. On the other hand, if the darkening area ratio becomes high up to for example about 30%, the toner consumption becomes extraordinarily high and so it becomes difficult to thoroughly mix the brand-new toner supplied newly into the developing device to fill up the toner consumption with the collected recycled toner before development. Accordingly, the mixture ratio of the new toner and collected toner in the toner used for development varies greatly, resulting in deteriorated image quality. It, therefore, is possible to set the second set value of which highest is for example 30% and so control that the air pump 110 is automatically operated to accumulate the collected toner into the collection container 130 when the darkening area ratio judged from to the image data is more than 30%.

Figure 3:
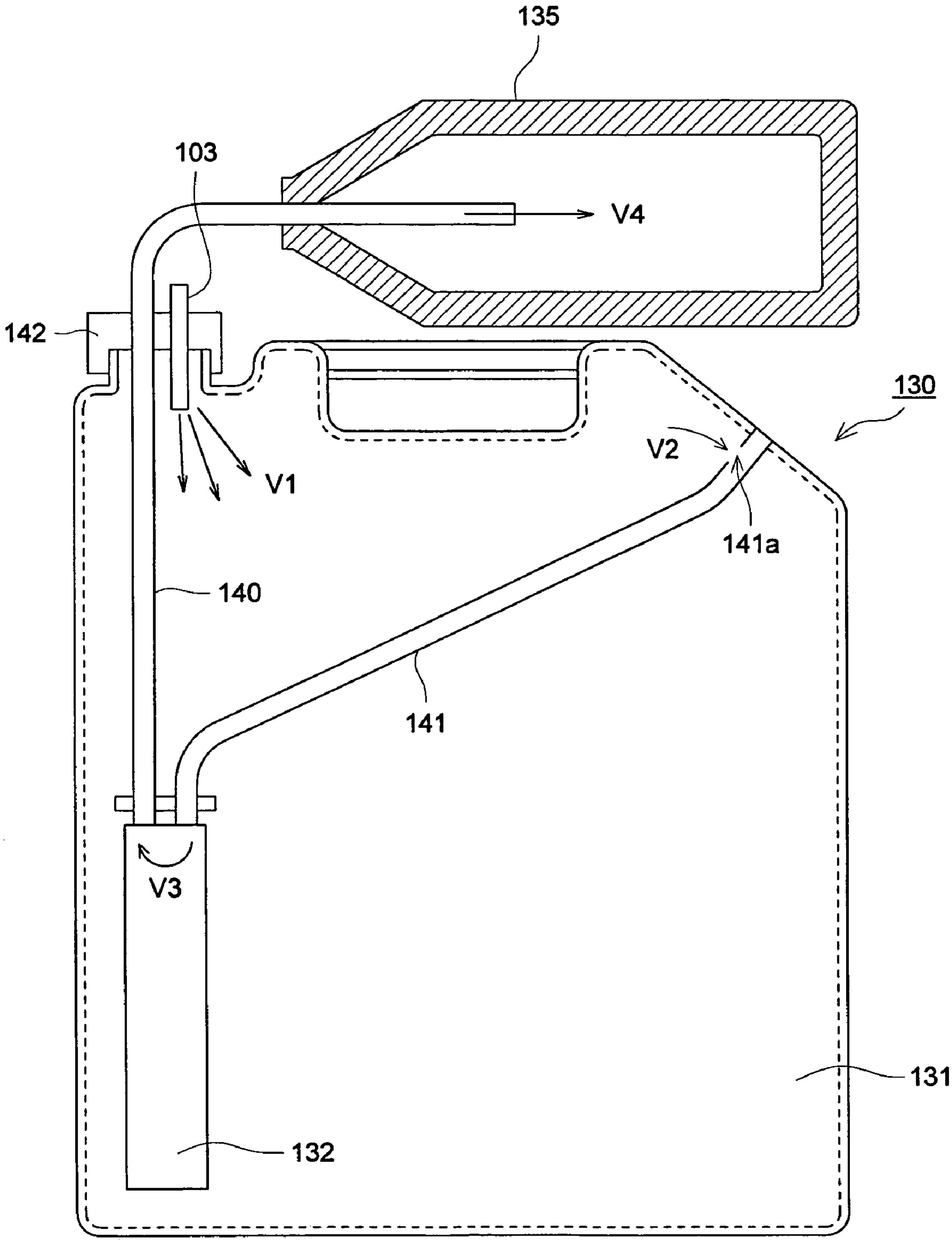
FIG. 3 is a schematic showing another example of a collection container.

FIG. 3 is a figure showing another example of a collection container.

The collection container 130 comprises a tank having a main accumulation chamber 131 and conveying pipes 103 and 140 are mounted on a cap 142 that seals the opening of the collection container 130. The conveying pipe 103 is an exhaust pipe of the air pump 110 as explained previously. A sub accumulation chamber 132 is provided in the collection container 130 and conveying pipes 140 and 141 are connected with the sub accumulation chamber 132. One end of the conveying tube 141 is fastened with the upper outside wall of the collection chamber 130 and the lower end is connected with the sub accumulation chamber 132. In addition, an air inlet port 141*a* is provided on the top of the conveying pipe 141. A filter bag 135 is installed on the top of the collection container 130 and the exhaust port of the conveying pipe 140 is made open inside the filter bag 135.

The toner-laden air flows from the conveying pipe 103 into the main accumulation chamber 131 as shown by the arrow V1 and toner falls down and accumulates in the main accumulation chamber 131. The air then flows into the conveying pipe 141 through the air inlet port 141*a* as shown by the arrow V2, and further flows into the conveying pipe 140 in the sub accumulation chamber 132 as shown by the arrow V3. During this flow, toner falls down and accumulates in the sub accumulation chamber 132. However, since the amount of toner contained in the air flowing into the sub accumulation chamber 132 is extremely small, toner accumulation in the sub accumulation chamber 132 is very little. The air removed of toner flows through the conveying pipe 140 into the filter bag 135 as shown by the arrow V4, and is further removed of toner by the filter bag 135, and then exhausted.

Although these embodiments are based on a monochrome image forming apparatus, the present invention can apply to a color image forming apparatus. In a color image forming apparatus, it is possible to so control that, for example, toner recycling is performed without operating the air pump in case of monochrome image forming and that the air pump is operated to collect toner into the collection container in case of color image forming.

Color image forming apparatus is available in two different designs: one where a toner image is directly transferred from the photosensitive material onto a transfer paper and the other where a toner image on the photosensitive material is transferred primarily onto an intermediate transfer material and then transferred secondarily from the intermediate transfer material onto a transfer paper. The present invention can apply to either design of the color image forming apparatus. For an apparatus using intermediate transfer material, the invention can apply not only to the cleaning member of the photosensitive material but also to the cleaning member of the intermediate transfer material.

According to the embodiment of the present invention, an image forming apparatus on which the toner recycle mode and toner disposal mode are selectable and toner is conveyed stably. Because the above two modes are switched by ON/OFF operation of the air pump, complicated switching mechanism is no longer needed and the cost increase due to the switching mechanism can be eliminated.

In addition, even when a failure is caused and the toner conveyance system equipped with the air pump ceases to operate for some reason, the apparatus itself does not become inoperable because the toner recycling device for conveying toner to the developing device operates correctly, and accordingly image forming can continue by using the recycling device.

Since the reverse flow prevention device prevents toner from flowing reversely into the toner recycling device, toner scattering due to reverse toner flow is prevented.

The construction of the collecting portion in this embodiment enables to prevent toner from flowing into the image forming apparatus from the exhaust port and so prevent the environment of the apparatus from possible contamination due to toner.

What is claimed is:

1. An image forming apparatus comprising:

a cleaning member for cleaning an image carrier after a toner image on the image carrier has been transferred;

a toner recycling device for conveying toner removed by the cleaning member to a developing device;

a collection section where the toner removed by the cleaning member is collected;

a branch conveyance path, branched from the toner recycling device, for conveying the toner to the collection section; and an air pump, provided on the branch conveyance path, for sucking air with the toner;

wherein, whether the toner is conveyed from the cleaning member to the collection section or to the developing device is switched corresponding to whether the air pump operates or does not operate.

2. The image forming apparatus of claim 1, further comprising a reverse flow prevention device, provided on the branch conveyance path, for preventing a reverse flow of the toner.

3. The image forming apparatus of claim 2, wherein the reverse flow prevention device is constructed with an encapsulated receptacle and comprises:

a first valve for enabling open and close of a first vent port in order to send the toner from the toner recycling device into the reverse flow prevention device; and a second valve for enabling open and close of a second vent port in order to send out the toner, having been sent through the first vent port into the reverse flow prevention device, toward the air pump.

4. The image forming apparatus of claim 1, wherein the collection section comprises:

a main accumulation chamber to which the air and the toner sucked by the air pump are flow in through an inlet port;

a sub accumulation chamber to which at least the air having passed through the main accumulation chamber flows in; and an exhaust port provided at the sub accumulation chamber.

5. The image forming apparatus of claim 4, wherein the sub accumulation chamber comprises:

a first vent port through which at least the air having passed through the main accumulation chamber flows in;

a partition, which has a second vent port, to spatially separate between the first vent port and the exhaust port; and a dust filter provided at the exhaust port;

wherein the first vent port, the second vent port, and the exhaust port are provided with alternately positioned at higher and at lower parts in the sub accumulation chamber, to form a crooked guide path of the air.

6. The image forming apparatus of claim 1, wherein the air pump comprises:

a suction chamber and a exhaust chamber separated with each other by a partition;

a diaphragm made of elastic rubber to increase and decrease a pressure in the suction chamber by deformation of the diaphragm;

a suction port to send the air with the toner into the suction chamber, when the pressure in the suction chamber is decreased;

a vent port to send the air with the toner in the suction chamber into the exhaust chamber when the pressure in the suction chamber is increased;

an exhaust port to send out the air with the toner sent into the exhaust chamber toward the collection section; a suction port air pump valve provided for enabling open and close of the suction port, the suction port air pump valve being displaceable inward the suction chamber; and a vent port air pump valve provided for enabling open and close of the vent port, the vent port air pump valve being displaceable inward the exhaust chamber.

7. The image forming apparatus of claim 1, wherein the air pump does not operate when a toner recycle mode is selected, and the air pump operates when a toner disposal mode is selected.

8. The image forming apparatus of claim 1, wherein the air pump operates or does not operate according with a setting of image forming condition.

9. The image forming apparatus of claim 1, wherein the air pump operates or does not operate according with a darkening area ratio judged according to image data of an original image.

10. The image forming apparatus of claim 9, wherein the air pump operates when the darkening area ratio is not greater than a first predetermined value.

11. The image forming apparatus of claim 9, wherein the air pump operates when the darkening area ratio is not less than a second predetermined value.

12. The image forming apparatus of claim 1, wherein the image forming apparatus is capable of forming a color image and a monochrome image, and when forming the color image the air pump operates.

* * * * *